United States Patent
De Rose et al.

(10) Patent No.: US 8,420,278 B2
(45) Date of Patent: Apr. 16, 2013

(54) SOLID OXIDE FUEL CELL HAVING A GLASS COMPOSITE SEAL

(75) Inventors: Anthony J. De Rose, Rochester, NY (US); Subhasish Mukerjee, Pittsford, NY (US); Karl Jacob Haltiner, Jr., Fairport, NY (US)

(73) Assignee: Delphi Technologies, Inc., Troy, MI (US)

( * ) Notice: Subject to any disclaimer, the term of this patent is extended or adjusted under 35 U.S.C. 154(b) by 57 days.

(21) Appl. No.: 12/981,881

(22) Filed: Dec. 30, 2010

(65) Prior Publication Data
US 2011/0269053 A1    Nov. 3, 2011

(51) Int. Cl.
*H01M 2/08*    (2006.01)
*H01M 2/14*    (2006.01)

(52) U.S. Cl.
USPC ............ 429/510; 429/507; 429/508; 429/509

(58) Field of Classification Search .................... 429/510
See application file for complete search history.

(56) References Cited

U.S. PATENT DOCUMENTS

| | | | |
|---|---|---|---|
| 6,430,966 B1 | 8/2002 | Meinhardt et al. | |
| 6,532,769 B1 | 3/2003 | Meinhardt et al. | |
| 6,656,625 B1 | 12/2003 | Thompson et al. | |
| 2005/0019645 A1 | 1/2005 | Thomas et al. | |
| 2005/0147866 A1 | 7/2005 | Ko et al. | |
| 2005/0170233 A1 | 8/2005 | Beatty et al. | |
| 2006/0286428 A1 | 12/2006 | Weng et al. | |
| 2010/0066036 A1 | 3/2010 | Cruse et al. | |
| 2010/0119917 A1* | 5/2010 | Kumar et al. | 429/35 |

* cited by examiner

*Primary Examiner* — Barbara Gilliam
*Assistant Examiner* — Steven Scully
(74) *Attorney, Agent, or Firm* — James M. Chan

(57) ABSTRACT

A solid oxide fuel cell stack having a plurality of cassettes and a glass composite seal disposed between the sealing surfaces of adjacent cassettes, thereby joining the cassettes and providing a hermetic seal therebetween. The glass composite seal includes an alkaline earth aluminosilicate (AEAS) glass disposed about a viscous glass such that the AEAS glass retains the viscous glass in a predetermined position between the first and second sealing surfaces. The AEAS glass provides geometric stability to the glass composite seal to maintain the proper distance between the adjacent cassettes while the viscous glass provides for a compliant and self-healing seal. The glass composite seal may include fibers, powders, and/or beads of zirconium oxide, aluminum oxide, yttria-stabilized zirconia (YSZ), or mixtures thereof, to enhance the desirable properties of the glass composite seal.

3 Claims, 2 Drawing Sheets

SOLID OXIDE FUEL CELL HAVING A GLASS COMPOSITE SEAL

GOVERNMENT-SPONSORED STATEMENT

This invention was made with the United States Government support under Contract DE-FC26-02NT41246 awarded by the U.S. Department of Energy. The Government has certain rights in this invention.

TECHNICAL FIELD OF INVENTION

The present disclosure relates to a solid oxide fuel cell (SOFC) stack having a glass seal; particularly, to a SOFC stack having a glass composite seal; more particularly, to a glass composite seal.

BACKGROUND OF INVENTION

Fuel cells are used to produce electricity when supplied with fuels containing hydrogen and an oxidant such as air. A typical fuel cell includes an ion conductive electrolyte layer sandwiched between an anode layer and a cathode layer. There are several different types of fuel cells known in the art; amongst these are solid oxide fuel cells (SOFC). SOFC are regarded as highly efficient electrical power generator that produces high power density with fuel flexibility.

In a typical SOFC, air is passed over the surface of the cathode layer and a fuel containing hydrogen is passed over the surface of the anode layer opposite that of the cathode layer. Oxygen ions from the air migrate from the cathode layer through the dense electrolyte to the anode layer in which it reacts with the hydrogen and CO in the fuel, forming water and $CO_2$ and thereby creating an electrical potential between the anode layer and the cathode layer of about 1 volt.

Each individual SOFC is mounted within a metal frame, referred to in the art as a retainer, to form a cell-retainer frame assembly. The individual cell-retainer frame assembly is then joined to a metal separator plate, also known in the art as an interconnector plate, to form a fuel cell cassette. The cassettes are stacked in series with a seal disposed between the sealing surfaces of each cassette to form a SOFC stack.

Seals for SOFC stacks require special properties such as a coefficient of thermal expansion comparable to those of the components of the SOFC stacks, a suitable viscosity to fill the any gaps in the sealing surfaces of the cassettes, ability to maintain a hermetic seal at operating temperatures of 500° C.-1000° C., good chemical stability, and long term sustainability.

For high temperature operations of a SOFC stack in the 800° C. to 1000° C. range, an alkaline earth aluminosilicate glass, such as a barium-calcium-aluminosilicate based glass, also known as G-18 glass, developed by Pacific Northwest National Laboratory (PNNL), is utilized for SOFC stack sealing applications. G-18 glass provides a seal material that offers high electrical resistively, high coefficient of thermal expansion, high glass transition temperature, and good chemical stability. However, G-18 glass crystallizes at prolonged elevated operating temperatures becoming hard and brittle over time, thereby losing its ability to fill in gaps in the sealing surfaces and its ability to provide a hermetic seal.

There is a need to have a seal material for a SOFC stack that provides the desirable properties of G-18 glass, but yet remains compliant at prolonged elevated operating temperature. There is still a further need to have a seal material that is self-healing to repair any weak points that may develop over time.

SUMMARY OF THE INVENTION

The present invention relates to a solid oxide fuel cell stack having a plurality of cassettes and a glass composite seal disposed between the sealing surfaces of adjacent cassettes, thereby joining the cassettes and providing a hermetic seal therebetween. The glass composite seal includes an alkaline earth aluminosilicate (AEAS) glass disposed about a viscous glass such that the AEAS glass retains the viscous glass in a predetermined position between the sealing surfaces. The glass composite seal may also include zirconium oxide, aluminum oxide, yttria-stabilized zirconia (YSZ), or mixtures thereof, to enhance the desirable properties of the glass composite seal.

The solid oxide fuel cell stack includes a first cassette having a first sealing surface and a second cassette having a second sealing surface complementary to the first sealing surface. The second cassette is disposed proximate to the first cassette such that the second sealing surface is oriented toward the first sealing surface. The glass composite seal is disposed between the first and second sealing surfaces, thereby joining the first cassette to the second cassette.

In one embodiment of the glass composite seal, disposed between the sealing surfaces of adjacent cassettes is a portion of viscous glass in direct contact with a portion of the sealing surfaces. The AEAS glass is disposed about and in contact with the viscous glass and the first and second sealing surfaces, thereby maintaining the viscous glass in a predetermined substantially central location.

In another embodiment of the glass composite seal, disposed between the sealing surfaces of adjacent cassettes is a highly porous AEAS glass. Disposed within the pores of the AEAS glass is a viscous glass. The porous AEAS glass provides geometrical stability to the glass composite seal maintaining the proper spatial distance between the adjacent cassettes while the viscous glass contained in the pores allows for compliance of the glass composite seal.

In yet another embodiment of the glass composite seal, disposed between the sealing surfaces of adjacent cassettes is a layer of viscous glass having fillers. Homogenously disposed within the viscous glass are fillers that may include AEAS glass, aluminum oxide, zirconium oxide, or mixtures thereof. The fillers may be in the form of fibers and/or powders to provide an aggregate of rigid materials to support the viscous glass, thereby providing structural integrity to the glass composite seal.

In still yet another embodiment of the glass composite seal, disposed between the sealing surfaces of adjacent cassettes is a layer of viscous glass. Disposed within the viscous glass is a plurality of beads that may be formed of AEAS glass and/or yttria-stabilized zirconia (YSZ). The YSZ beads are approximately 25 to 200 microns in diameter and acts as a spacer within the viscous glass to provide geometric stability to the glass composite seal.

The glass composite seal provides the benefits of maintaining a compliant robust hermetic seal over prolonged elevated temperature and repeated thermal cycling of a SOFC stack. The AEAS glass provides for the structural integrity to maintain the geometric stability of the glass composite seal between cassettes while the viscous glass provides for a complaint and self-healing seal.

Further features and advantages of the invention will appear more clearly on a reading of the following detailed description of an embodiment of the invention, which is given by way of non-limiting example only and with reference to the accompanying drawings.

BRIEF DESCRIPTION OF DRAWINGS

This invention will be further described with reference to the accompanying drawings in which.

DETAILED DESCRIPTION OF INVENTION

Figure 1:
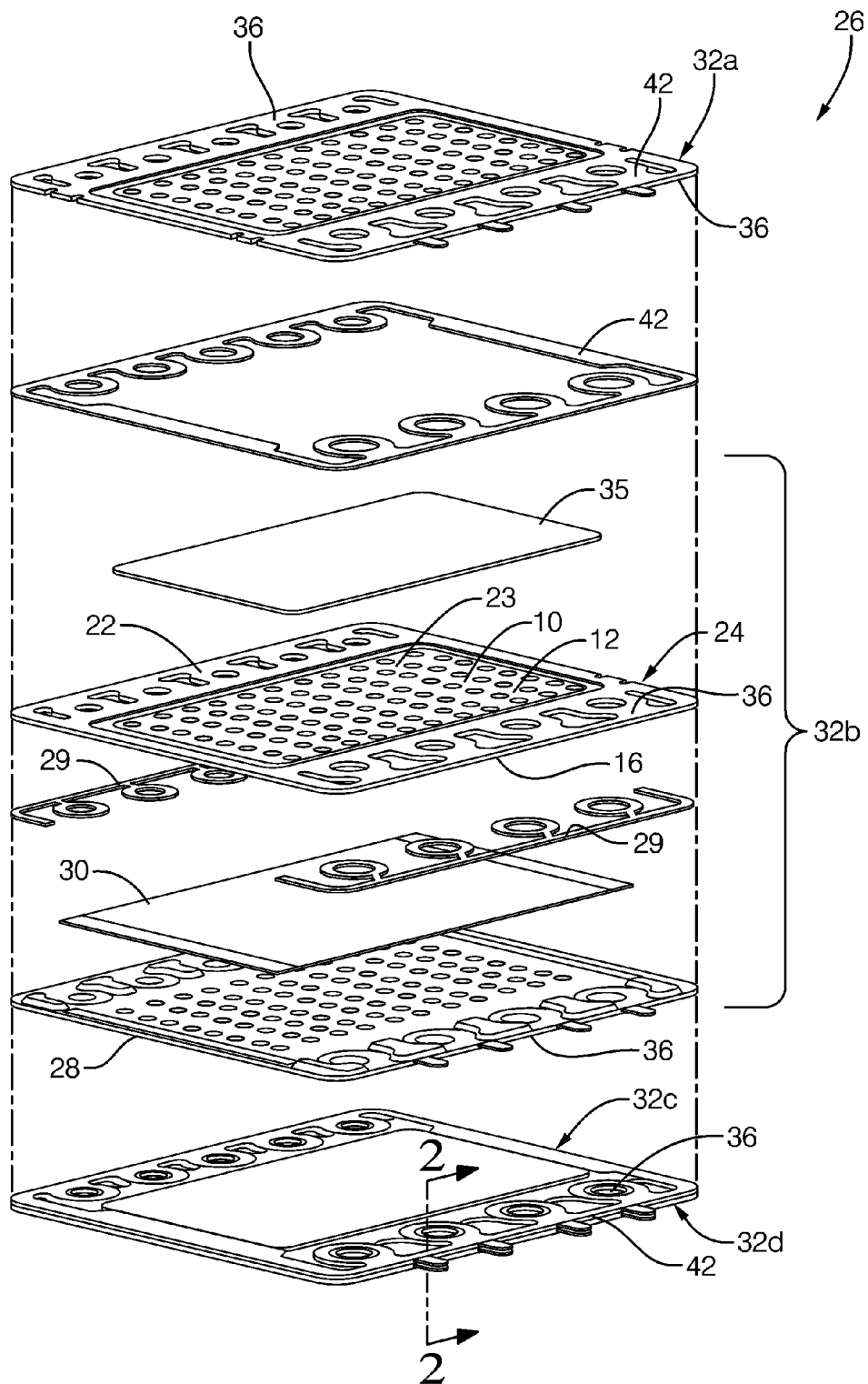
FIG. 1 is an exploded isometric drawing of a portion of a SOFC stack employing a plurality of single-cell cassettes.

In accordance with a preferred embodiment of this invention, referring to FIG. 1 is a solid oxide fuel cell stack 26 having a glass composite seal 42 between the sealing surfaces of the cassettes 32a, 32b, 32c, 32d. FIGS. 2 through 5 show alternative embodiments of the glass composite seal 42 shown in FIG. 1. The glass composite seal 42 includes an alkaline earth aluminosilicate (AEAS) based glass and a viscous glass. The AEAS glass provides the strength to maintain the structural integrity of the glass composite seal 42 between the cassettes 32a, 32b, 32c, 32d while the viscous glass provides a self-healing feature to ensure the longevity of the glass composite seal 42 over prolonged exposure at elevated operating temperatures and repeated thermal cycles. The glass composite seal 42 may include zirconium oxide, aluminum oxide fibers, and/or yttria-stabilized zirconia (YSZ) to enhance the desirable properties of the glass composite seal 42. The details and advantages the glass composite seal 42 will be disclosed in greater detail below.

Shown in FIG. 1 an exploded isometric drawing of a portion of a SOFC stack 26 employing a plurality of single-cell cassettes 32a, 32b, 32c, 32d. The first and second cassettes 32a, 32b and the glass composite seal 42 therebetween are shown spaced apart from each other. The third and fourth cassettes 32c, 32d are shown jointly sealed to each other with the glass composite seal 42 therebetween.

For illustrative purposes, the second cassette 32b is shown in an exploded view to detail the components that form each of the cassettes 32a, 32b, 32c, 32d. The second cassette 32b includes a fuel cell 10 mounted within a retainer frame 22. The fuel cell 10 is comprised of an electrolyte layer (not shown) sandwiched between a cathode layer 12 and an anode layer 16. The retainer frame 22 defines a central opening or picture frame window 23. The fuel cell 10 is positioned in the picture frame window 23 and joined to the retainer frame 22 to form a cell-retainer frame assembly 24. An intermediate process joins together cell-retainer frame assembly 24, anode spacers 29, an anode interconnect 30, a cathode interconnect 35, and a separator plate 28 to form the complete second cassette 32b. The first, third, and forth fuel cell cassettes 32a, 32c, 32d are formed with similar components as that for the second cassette 32b. Each of the cassettes 32a, 32b, 32c, 32d includes sealing surfaces 36, in which the sealing surfaces of each cassette are complementary to the sealing surface 36 of the adjacent cassette to which it is joined. The cassettes 32a, 32b, 32c, 32d are then assembled in series to form a SOFC stack 26.

During the assembly of the cassettes 32a, 32b, 32c, 32d into a SOFC Stack 26, a glass composite seal 42 is disposed between the sealing surfaces of the adjacent cassettes 32a, 32b, 32c, 32d. The glass composite seal 42 is heat treated to form a bonded joint to provide a gas-tight seal to separate and contain the reactant gases and electrically isolate the adjacent separator plates 28. The glass composite seal 42 comprises of an alkaline earth aluminosilicate (AEAS) based glass 46 and a viscous glass 44. An example of an AEAS based glass is a barium-calcium-aluminosilicate (BCAS) glass, such as G-18 glass. Viscous glass 44 is defined as any glass that remains in a fully or partially amorphous phase within the standard operating temperature of a SOFC stack 26, which is about 500° C. to 1000° C., even after prolong periods of exposure, and retains its ability to flow. Examples of viscous glass include B—Ge—Si—O glasses, which retains approximately 70% amorphous phase after 1500 hours at 850° C.; barium alkali silicate glass; and SCN-1 glass, commercially available from SEM-COM Company, Inc.

FIGS. 2 through 5 show alternative embodiments of the glass composite seal taken along lines 2-2 of the joined third and fourth cassettes 32c, 32d shown in FIG. 1. Four alternative embodiments of the glass composite seal 42 are shown sandwiched between the sealing surfaces 36 of the third cassettes 32c and fourth cassette 32d, in which each embodiment includes a composition of an AEAS glass 46, a viscous glass 44, and/or fillers 47.

Figure 2:
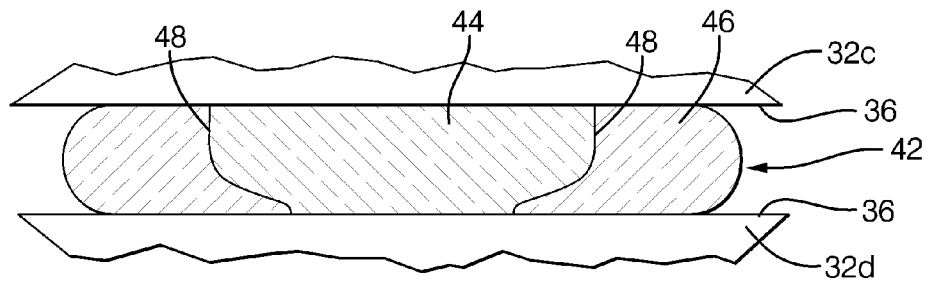
FIG. 2 is a partial cross-section taking along lines 2-2 of FIG. 1 showing a first embodiment of the glass composite seal.

FIG. 2 shows a first embodiment of the glass composite seal 42, which includes a central portion formed of a viscous glass 44 maintained in position by a boundary layer of AEAS glass 46. A portion of the viscous glass 44 is in direct contact with a portion of the sealing surfaces 36 of the third and fourth cassettes 32c, 32d. The AEAS glass 46 is disposed about the exposed perimeter 48 of the viscous glass 44 such that the AEAS glass 46 retains the viscous glass 44 between the respective sealing surfaces 36 of the cassettes 32c, 32d. The AEAS glass 46 provides the structural integrity required for proper spacing between the cassettes 32c, 32d, thereby allowing the viscous glass 44, which has minimal structural integrity at normal operating temperatures, to perform the function of maintaining a compliant hermetic seal.

Figure 2A:
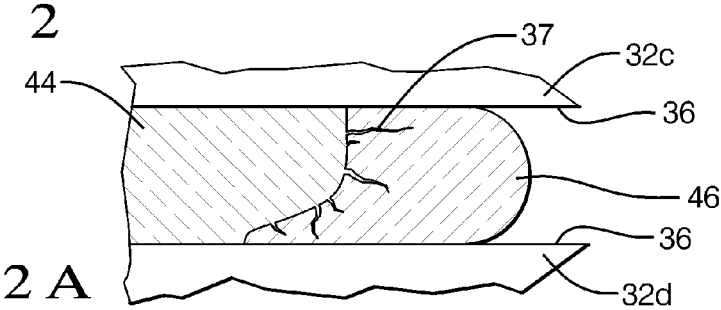
FIG. 2a is the glass composite seal shown in FIG. 2 having a plurality of micro-fractures.

Shown in FIG. 2a, the AEAS glass 46 crystallizes becoming hard and brittle over prolonged exposure to elevated operating temperatures. The repeated thermal cycling of the SOFC stack 26 may induce sufficient stress into the brittle AEAS glass 46 to form micro-fractures 37 therein; however, the viscous glass 44 remains in an amorphous flowable phase throughout the life of the SOFC stack 26. As the micro-fractures 37 within the AEAS glass 46 comes into hydraulic communication with the viscous glass 44, the viscous glass 44 flows into the voids defined by the micro-fracture 37 and provides a self-healing glass seal.

Figure 3:
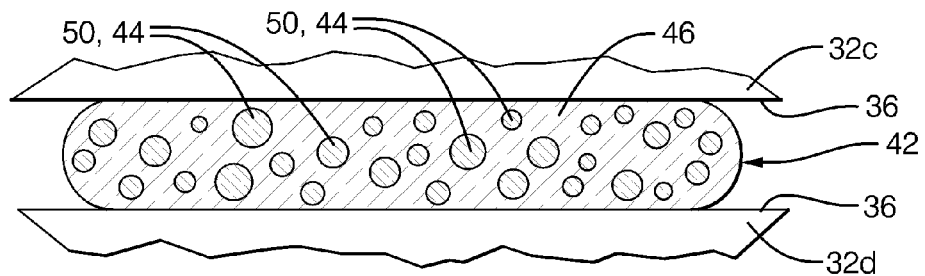
FIG. 3 is a partial cross-section taking along lines 2-2 of FIG. 1 showing a second embodiment of the glass composite seal.

Shown in FIG. 3 is another embodiment of the glass composite seal 42. Disposed between the sealing surfaces 36 of the third and fourth cassettes 32c, 32d is a highly porous AEAS glass 46. Disposed within the pores 50 of the AEAS glass 46 is a viscous glass 44. The porous AEAS glass 46 provides geometrical stability to the glass composite seal 42 to maintain the proper spatial distance between the cassettes 32d, 32d, while the viscous glass 44 contained in the pores 50 allows for compliance of the glass composite seal 42. Furthermore, as micro-fractures form in the AEAS glass 46 from prolong exposure at elevated temperatures and repeated thermal cycling, the viscous glass 44 flows from the pores 50 and disperses throughout the micro-fractures of the AEAS glass 46, thereby providing the benefits of a self-healing seal.

Figure 4:
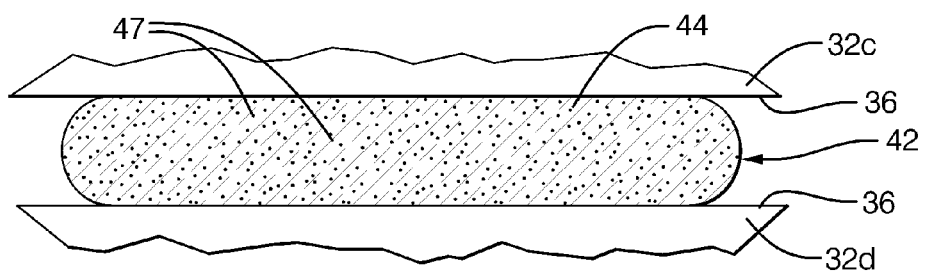
FIG. 4 is a partial cross-section taking along lines 2-2 of FIG. 1 showing a third embodiment of the glass composite seal.

Shown in FIG. 4 is yet another embodiment of the glass composite seal 42. Disposed between the sealing surfaces 36 of the third and fourth cassettes 32c, 32d is a glass composite seal 42 having fillers 47 homogenously disposed within a viscous glass layer. The viscous glass 44 withstands crystallizing at prolonged exposure to elevated temperature over time and provides robustness to thermal cycling. However, the viscous glass 44, by itself, may lack the structural integrity to maintain the geometric stability of the glass composite seal 42 between the cassettes 32c, 32d. To provide the strength necessary, homogenously disposed within the viscous glass are fillers 47 that may include AEAS glass, aluminum oxide, zirconium oxide, or mixtures thereof. The fillers 47 may be in the form of fibers and/or powders to provide an aggregate of rigid materials to the viscous glass 44.

Figure 5:
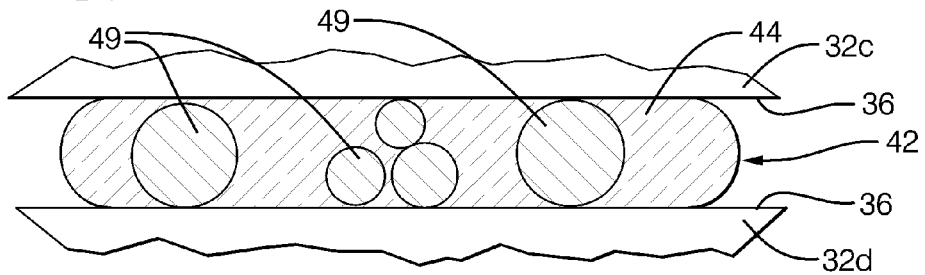
FIG. 5 is a partial cross-section taking along lines 2-2 of FIG. 1 showing a fourth embodiment of the glass composite seal.

Shown in FIG. 5 is still yet another embodiment of the glass composite seal 42. Disposed between the sealing surfaces 36 of the third and fourth cassettes 32c, 32d is a layer of viscous glass 44. Disposed within the viscous glass is a plurality of beads 49 that may be formed of AEAS glass 46 and/or yttria-stabilized zirconia (YSZ). The beads 49 are approximately 25 to 200 microns in diameter and acts as a spacer within the viscous glass 44. The beads 49 resist deformation under load at elevated temperature and are compatible with the fuel cell assembly process. Having the beads 49 in the glass composite seal 42 provides a mean for controlling the seal spacing between adjacent cassettes 32c, 32d. In additional, with a given seal spacing, the spacing can vary due to cassettes warping at elevated temperatures. In this case, the beads 49 provide a uniform seal thickness by limiting warping of the adjoining cassettes 32c, 32d. The beads 49 may be include in the tape cast glass material and may be die cut into bonding gaskets or added to the paste.

The glass composite seal 42 provides the benefits of maintaining a compliant robust hermetic seal over prolonged elevated temperature and repeated thermal cycling of a SOFC stack 26. The AEAS glass 46 provides for the structural integrity to maintain the geometric stability of the glass composite seal 42 between cassettes 32c, 32d, while the viscous glass 44 provides for a complaint and self-healing seal.

While this invention has been described in terms of the preferred embodiments thereof, it is not intended to be so limited, but rather only to the extent set forth in the claims that follow.

Having described the invention, it is claimed:

1. A solid oxide fuel cell stack comprising:
a first cassette having a first sealing surface;
a second cassette having a second sealing surface complementary to said first sealing surface, wherein said second cassette is disposed proximate to said first cassette such that said second sealing surface is oriented toward said first sealing surface; and
a glass composite seal disposed between said first and second sealing surfaces, thereby joining said first cassette to said second cassette;
wherein said glass composite seal comprises an alkaline earth aluminosilicate (AEAS) glass and a viscous glass;
wherein said viscous glass is a single continuous portion sandwiched between and in direct contact with said first and second sealing surfaces;
wherein said viscous glass includes a perimeter defined by a surface portion of said viscous glass that not in contact with said first and second sealing surfaces; and
wherein said AEAS glass surrounds said perimeter of said viscous glass and is in contiguous contact with said perimeter of said viscous glass together with said sealing surfaces such that said AEAS glass retains said viscous glass in a predetermined position between said first and second sealing surfaces.

2. The solid oxide fuel cell stack of claim 1, wherein:
said AEAS glass includes a barium-calcium-aluminosilicate (BCAS) glass; and
said viscous glass includes an amorphous flowable phase within the standard operating temperature of said fuel cell stack.

3. The solid oxide fuel cell stack of claim 1, wherein:
said AEAS glass includes a barium-calcium-aluminosilicate (BCAS) glass; and
said viscous glass includes an amorphous flowable phase within the standard operating temperature of said fuel cell stack.

* * * * *